United States Patent [19]
Schnitzler

[11] Patent Number: 4,949,577
[45] Date of Patent: Aug. 21, 1990

[54] METERING ASSEMBLY FOR TANK TRUCK/TRAILER
[75] Inventor: James J. Schnitzler, Barrington, Ill.
[73] Assignee: Accurate Metering Systems, Inc., Schaumburg, Ill.
[21] Appl. No.: 237,057
[22] Filed: Aug. 29, 1988
[51] Int. Cl.⁵ .............................................. G01F 15/08
[52] U.S. Cl. ..................................................... 73/200
[58] Field of Search ........................... 73/200; 210/445
[56]  References Cited
U.S. PATENT DOCUMENTS
326,569  9/1885  Kirkaldy ............................. 210/455
4,617,827 10/1986 Grönke ................................. 73/200
4,803,887  2/1989  Sanden et al. ..................... 73/864.34

Primary Examiner—Herbert Goldstein
Attorney, Agent, or Firm—Thomas R. Vigil

[57] ABSTRACT

The metering assembly for a tank truck/trailer comprises a number of elements including an air eliminator vessel, legs and brackets for mounting the air eliminator vessel in a compartment of the tank truck/trailer, a pump mounted in the compartment and a fluid connection between the pump and the air eliminator vessel. A hose is also provided connected to the pump and is adapted to be inserted into an outside receptacle containing liquid for supplying or withdrawing liquid to or from the receptacle. A flow meter is fluidly coupled to the air eliminator vessel and a mounting bracket is provided for mechanically mounting the flow meter to the eliminator vessel. The flow meter has an outlet coupled to the tank of the tank truck. A strainer is provided for straining liquid pumped to or from the receptacle prior to the delivery of the liquid to or from the tank of the tank truck/trailer. A frequency scaling board is coupled to the flow meter and a printer is coupled to the frequency scaling board for printing out the amount of liquid received into or from the tank from or to the outside receptacle.

9 Claims, 5 Drawing Sheets

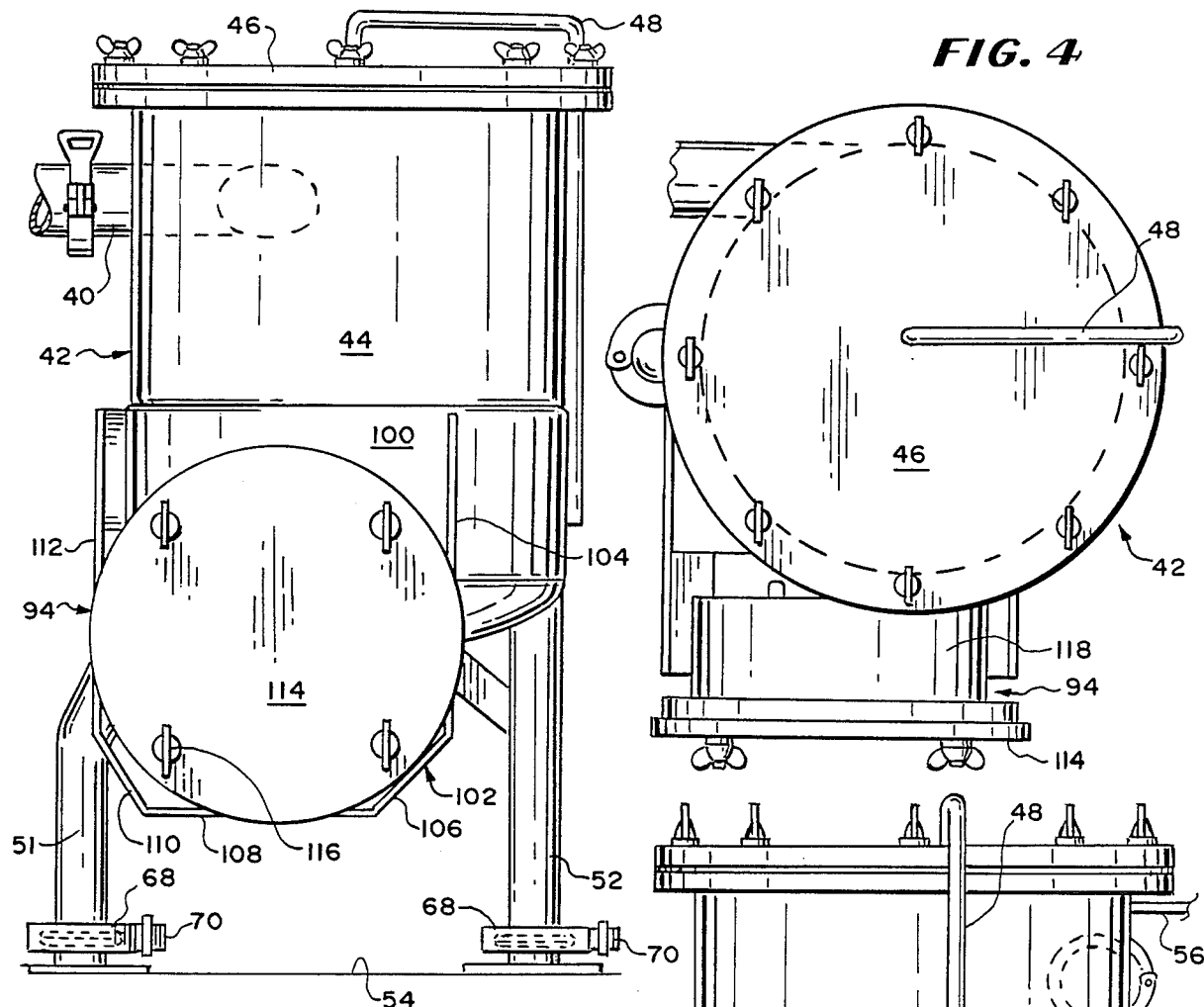
FIG. 4
FIG. 3
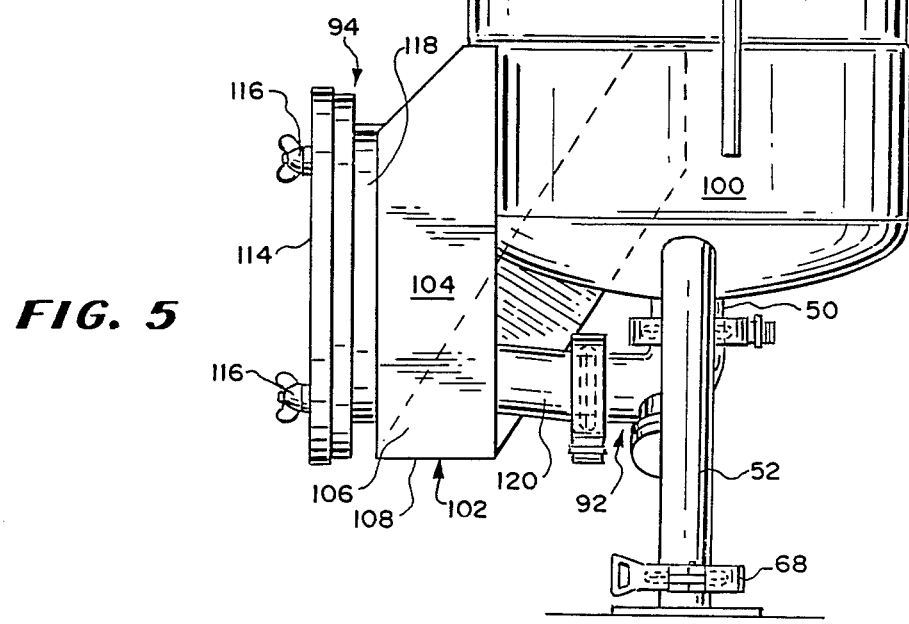
FIG. 5

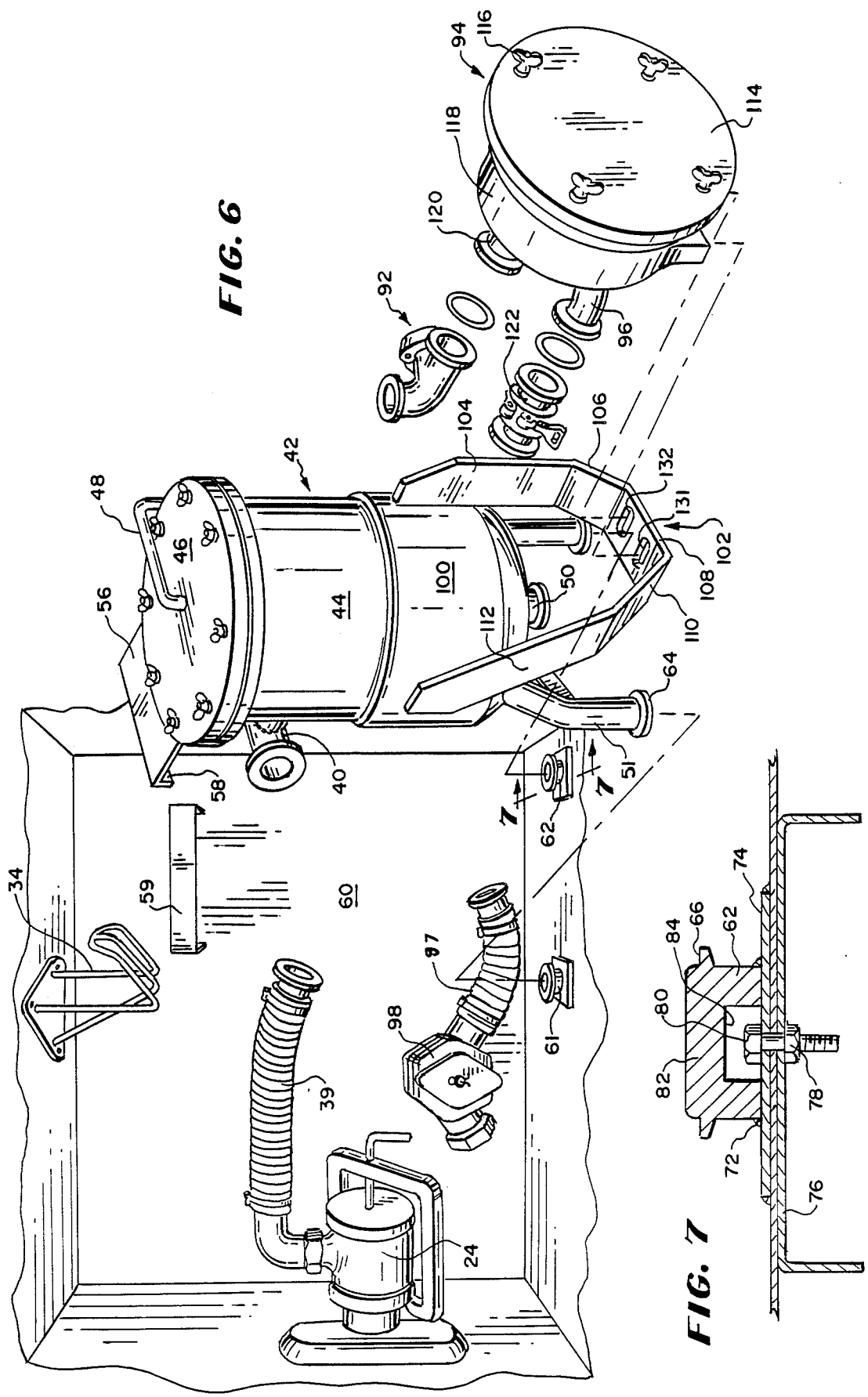

METERING ASSEMBLY FOR TANK TRUCK/TRAILER

BACKGROUND OF THE INVENTION

1. Field of the Invention

The present invention relates to a compact metering assembly which is adapted to be mounted in a compartment on a tank truck/trailer, which is designed to take up a minimum of space and which includes a measuring system for measuring the amount of liquid pumped into the tank truck/trailer from an outside receptacle.

2. Description of the Prior Art

Heretofore a tank truck/trailer for picking up liquid from a number of different sites, such as a milk truck for picking up milk from various farmers, had mounted on a tank truck/trailer, in a small compartment provided therefor, a pump, a motor for the pump and a hose connected to the farmer's bulk cooling or simply cooler.

The amount of milk delivered to the tank truck was determined by first inserting a measuring stick in the milk cooler to determine the level of milk in the cooler. Then an operator would pump the milk out of the bulk tank cooler into the truck and proceed to the next bulk tank cooler and make a similar measurement.

The height of milk in the milk cooler is directly related to the number of gallons in the bulk milk cooler. In this respect, the measuring stick was calibrated in gallons per unit height of the milk cooler.

This technique worked satisfactorily but was cumbersome and awkward. In this respect, a clean measuring stick had to be available and the quantity of milk in each milk cooler had to be measured and entered on a log. Then all entries on the log for each farmer had to be added up to determine the amount of milk received from all the farmers.

Accordingly, it was desirable to provide an automated mechanism for pumping liquid, such as milk, from receptacles such as bulk milk coolers into a tank truck/trailer through a flow meter whereby the flow meter would measure the amount of milk received into the tank truck/trailer. Such metering assemblies, including a flow meter, have been proposed and utilized in the past.

However, such prior metering assemblies were bulky and did not fit conveniently into the existing compartments on tank trucks/trailers. As a result, special modifications had to be made to the tank/trailer to mount the metering assembly therein or elements of the metering assembly were carried separately and connected to the rear of the tank/truck instead of being individually mounted in the compartment.

As will be described in greater detail, the metering assembly of the present invention provides a compact metering and pumping assembly which includes a pump, an inlet hose, an air eliminator vessel, a flow meter and a strainer assembly conveniently and compactly mounted to each other and within a conventional existing compartment on a tank truck/trailer.

SUMMARY OF THE INVENTION

According to the present invention there is provided a metering assembly for a tank truck/trailer comprising: an air eliminator vessel; means for mounting the air eliminator vessel in a compartment of the tank truck/trailer; a pump mounted in the compartment; a fluid connection between the pump and the air eliminator vessel; a hose connected to the pump and adapted to be inserted in an outside receptacle containing liquid to be pumped into or out of the tank truck/trailer; a flow meter fluidly coupled to the air eliminator vessel; an outlet from the flow meter coupled to the tank of the tank truck/trailer; and means for straining liquid from or to the receptacle prior to the delivery of the liquid into or from the tank of the tank truck/trailer. The means for straining liquid include a strainer assembly coupled between the outlet of the air eliminator vessel and the inlet to the flow meter. The strainer assembly comprises a tubular elbow having a short tube portion and a long tube portion, a side tube extending laterally outwardly from the long tube portion adjacent the corner connection with the short tube portion, and a strainer member in the form of an elongate strainer plate received in the side tube and positioned to block the flow of any large particles flowing through the tubular elbow. The strainer plate has a rib which extends outwardly from and longitudinally along one side of the strainer plate.

Also according to the present invention there is provided a metering assembly for a tank truck/trailer comprising: an air eliminator vessel comprising a hollow body; means for mounting said air eliminator vessel in a compartment of the tank truck/trailer including first and second legs fixed to and depending from the hollow body and a U-shaped bracket mounted on a wall of the compoartment and an L-in-cross-section bracket mounted to the body and having a outer depending flange which is received within the U space of the U-shaped bracket; a pump mounted in the compartment; a fluid connection between the pump and the air eliminator vessel; a hose connected to the pump and adapted to be inserted in an outside receptacle containing liquid to be pumped into or out of the tank truck/trailer; a flow meter fluidly coupled to the air eliminator vessel; an outlet from the flow meter coupled to the tank of the tank truck/trailer; and means for straining liquid pumped from or to the receptacle prior to the delivery of the liquid into or from the tank of the tank truck/trailer.

Further according to the present invention there is provided a metering assembly for a tank truck/trailer comprising: an air eliminator vessel; means for mounting the air eliminator vessel in a compartment of the tank truck/trailer; a pump mounted in the compartment; a fluid connection between the pump and the air eliminator vessel; a hose connected to the pump and adapoted to be inserted in an outside receptacle containing liquid to be pumped into or out of the tank truck/trailer; a flow meter fluidly coupled to the air eliminator vessel; mounting means for mounting the flow meter to said air eliminator vessel includes metal reinforcing band around and fixed to said vessel, and a bracket including a vertical poriton fixed to said metal reinforcing band and extending downwardly to a horizontal portion and an incline vertical portion which extends upwardly on the other side of said horizontal portion and is fixed to said metal reinforcing band, said flow meter being supported on said horizontal portion of said bracket; an outlet from said flow meter coupled to the tank of the tank truck/trailer; and means for straining liquid pumped from or to the receptacle prior to the delivery of the liquid into or out of the tank of the tank truck/trailer.

Still further according to the present invention there is provided a metering assembly for a tank truck/trailer comprising: an air eliminator vessel; means for mounting the air eliminator vessel in a compartment of the tank truck/trailer; a pump mounted in the compartment; a fluid connection between the pump and the air eliminator vessel; a hose connected to the pump and adapted to be inserted in an outside receptacle containing liquid to be pumped into or out of the tank truck/trailer; a flow meter fluidly coupled to the air eliminator vessel; an outlet from said flow meter coupled to the tank of the tank truck/trailer; means for straining liquid pumped from or to the receptacle prior to the delivery of the liquid into or from the tank of the tank truck/trailer; measuring circuit means comprising a frequency scaling board coupled to the flow meter; a printer coupled to the frequency scaling board for printing out the amount of liquid received in the tank from an outside bulk cooler; a motor control circuit coupled to the frequency scaling board; and, a motor mechanically coupled to the pump for driving same and electrically coupled to the motor control circuit.

BRIEF DESCRIPTION OF THE DRAWINGS

FIG. 3 is a front elevational view of a liquid receiving air eliminating bank and flow meter assembly.

FIG. 4 is a top plan view of the assembly shown in FIG. 3.

FIG. 5 is a side elevational view of the assembly shown in FIG. 3.

FIG. 6 is an exploded perspective view of the assembly shown in FIGS. 1, 2 and 3.

FIG. 7 is a sectional view taken along line 7—7 in FIG. 6 and shows a mounting foot for one of two legs for supporting the tank of the assembly shown in FIG. 6.

DESCRIPTION OF THE PREFERRED EMBODIMENT

Figure 1:
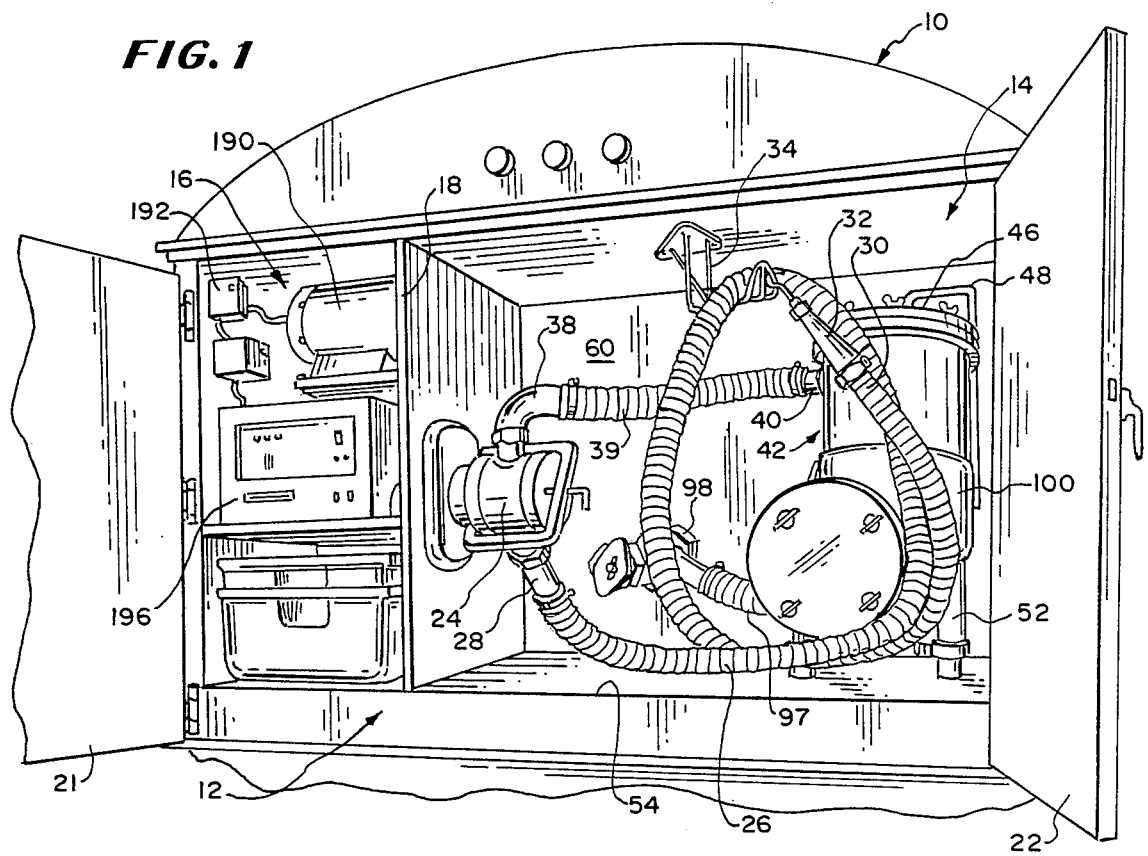
FIG. 1 is a perspective view of a compartment at the rear of a tank truck/trailer with the doors of the compartment swung open and shows a pumping metering and control system.

Rererring now to the drawings in greater detail, there is illustrated in FIG. 1, a rear end of a tank truck/trailer 10 and, in particular, a compartment 12 located at the rear end of the tank truck 10. The compartment 12 in the tank truck 10 has limited space in terms of height, width and depth and is divided into two subcompartments 14 and 16 by a partition wall 18. These compartments 14 and 16 are normally closed by a pair of swinging doors 21 and 22.

In the open position of the doors 21 and 22, as shown in FIG. 1, access can be had to the compartment 14 and 16.

Mounted to the partition wall 18 between the compartments 14 and 16 is a pump 24. A length of flexible hose 26 is connected to an inlet end 28 of the pump 24. The flexible hose 26 has, at its distal end 30, a nozzle 32. The length of hose 26 is adapted to be supported, when not in use, from a bracket 34 fixed to a top wall 36 of the compartment 14.

In use, such as when the tank truck is being utilized for transpoorting milk from farms to dairies, the nozzle 32 is connected to a milk bulk cooler and the pump 24 is operated to pump milk from the farmer's bulk tank cooler into the tank truck 10.

An outlet end 38 of the pump 24 is connected by a hose 39 to an upper inlet 40 of an air eliminator vessel tank 42 which includes a hollow generally cylindrical body 44 having a cover 46, a vent tube 48 extending from the cover 46, and an outlet 50 (FIG. 5).

According to the teachings of the present invention, the air eliminator vessel 42 has two tubular legs 51 and 52 (FIG. 3) for supporting the air eliminator vessel 42 in the compartment 14 on a bottom wall 54 thereof. To provide the air eliminator vessel 42 with stability, an L-in-cross-section bracket 56 is fixed to and extends rearwardly from the cylindrical body 44 just beneath the cover 46 and has a downwardly extending flange 58 (FIG. 6). This L-shaped bracket 56 is adapted to be received in a generally U-shaped bracket 59 which is mounted to and extends outwardly from a back wall 60 of the compartment 14.

The legs 51 and 52 are adapted to be received in and secured in foot members 61 and 62 which are fixed to the bottom wall 54 of the compartment 14 (FIG. 6).

Figure 2:
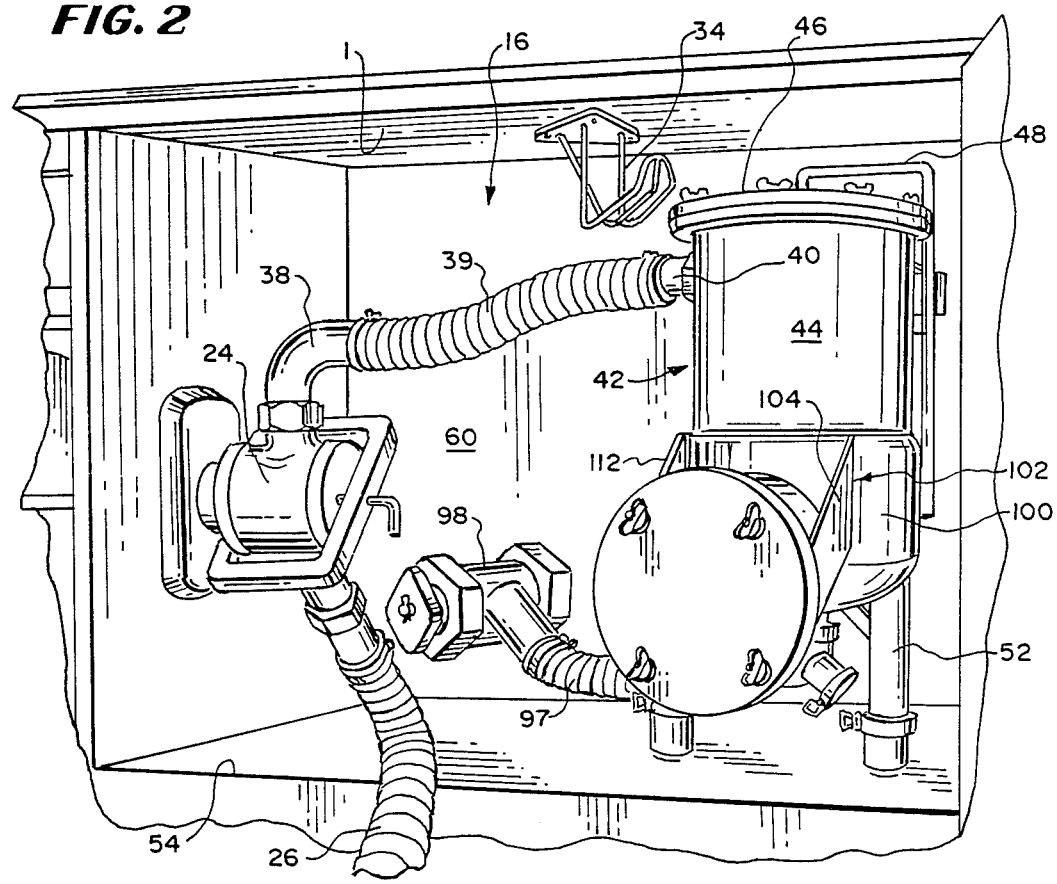
FIG. 2 is an enlarged perspective view of the pumping and metering section of the compartment shown in FIG. 1.

As best shown in FIGS. 2 and 3, the bottom of each leg 51, 52 has a flange 64 which rests upon a flange 66 of each of the foot members 61, 62. Then, a channel shaped clamp 68 is received around the aligned flanges 64 and 66 and fixed in place with a threaded member 70.

With reference to FIG. 7, each foot member, such as foot member 62 shown in FIG. 7, is fixed, such as by fillet welding 72 to a base plate 74 fastened to the bottom wall 54. A reinforcing bottom plate 76 is positioned beneath the bottom wall 54. A nut 78 and bolt 80 fastener assembly extends through aligned holes in the base plate 74, the bottom wall 54 and the reinforcing plate 76 for clamping the base plate 74 to the bottom wall 54.

The foot member 62 includes a body portion 82 having a cavity 84 in the bottom thereof for receiving the bolt 80 and the outer annular flange 66.

As best shown in FIG. 5, the outlet 50 from the air eliminator vessel 42 is connected to a strainer assembly 92 to be described in greater detail hereinafter. The strainer assembly 92 is connected to a flow meter 94 and an outlet tube 96 (FIG. 6) from the flow meter 94 is connected by a hose 97 to an inlet 98, mounted in the back wall 60 of the compartment 14, to the tank of the tank truck 10.

As shown in FIGS. 1, 2, 3 and 5, the cylindrical body 44 has a maetal reinforcing band 100 fixed around the bottom portion thereof and a specially configured bracket 102 is fixed to and extends downwardly and rearwardly from the metal reinforcing band 100 for mounting the flow meter 94. The bracket 102 includes a first arm portion 104 which extends generally vertically downwardly from the band 100 to an angular portion 106 and then horizontally in a horizontal portion 108 to another angular portion 110 which extends upwardly to a second arm portion 112 which extends generally vertically upwardly and angularly forwardly, as shown in FIG. 5.

The flow meter 94 is received in the U-shaped space defined by the bracket 102 and rests on the horizontal bottom portion 108 of the bracket 102.

The flow meter 94 is of conventional construction and includes a front cover plate 114 which is secured by fasteners 116 to a body 118. Extending from the rear of the body 118, as shown in FIG. 5, is an inlet tube 120 which is connected to the strainer assembly 92. Also extending from the back of the body 118 is the outlet tube 96 which is connected by a check valve 122 to the flexible hose 97 connected to the inlet tube 98 to the tank of the tank truck 10.

From the foregoing description, it will be apparent that the U-shaped bracket 102 fixed to the metal reinforcing band 100 on the cylindrical body 44 provides a simple, efficient and compact mounting of the flow meter 94 to the air eliminator air vessel 42. As shown in FIG. 6, the bottom horizontal portion 108 of the bracket 102 can have two slots 131 and 132 therein for receiving spaced apart bosses (not shown) on the bottom side of the body 118 of the flow meter 94.

Also, it will be apparent from the foregoing description that a very simple, efficient and compact mechanism is provided for mounting the air eliminator vessel 42 in the compartment 14. This mounting mechanism is defined by the two legs 51 and 52, the two foot members 61 and 62 mounted on the bottom wall 54 of the compartment 14 on which bottom flanges 64 of the legs 51,52 are mounted with C-clamps 68, the L-in-cross-section bracket 56 and the U-shaped bracket 59 mounted to the back wall 60 of the compartment 14 to which the L-shaped bracket 56 is coupled. In this way, the need for an additional leg is eliminated conserving both on space, parts and cost.

Figure 8:
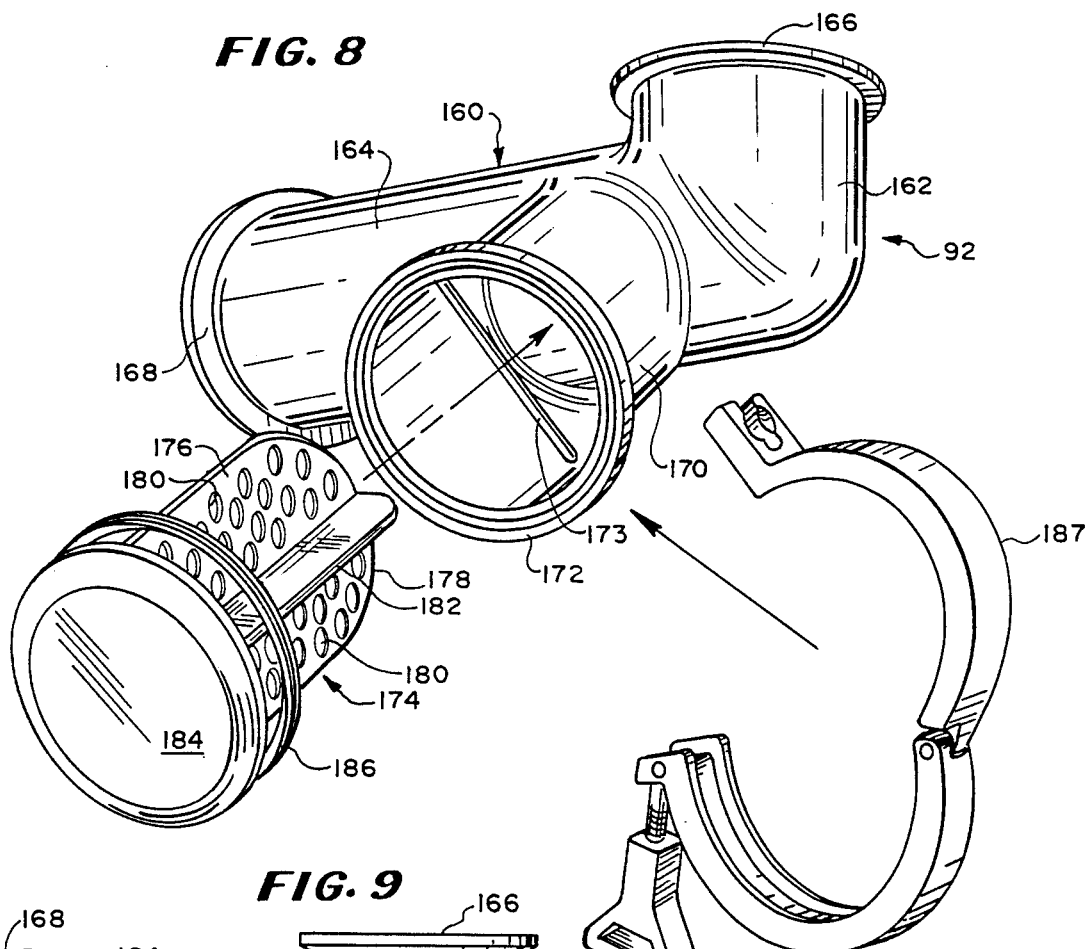
FIG. 8 is an exploded perspective view of a unique filter trap assembly at the bottom of the tank shown in FIG. 6.
Figure 9:
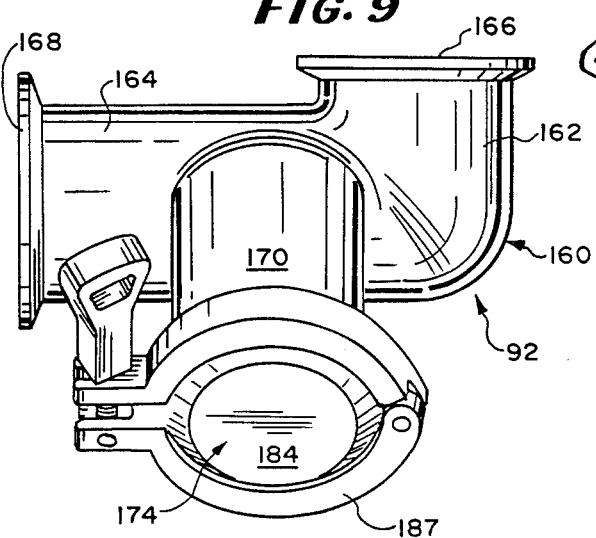
FIG. 9 is a side elevational view of the filter trap assembly shown in FIG. 8 and is taken along line 9—9 of FIG. 8.
Figure 10:
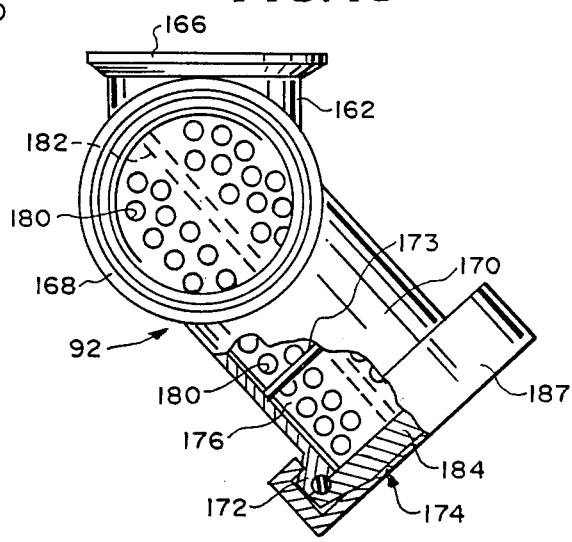
FIG. 10 is an end elevational view of the filter trap assembly shown in FIG. 9 and is taken along line 10—10 of FIG. 9.

Referring now to FIGS. 8, 9 and 10, the strainer assembly 92 includes an elbow or L-shaped tubing 160 including a short tube portion 162 and a long tube portion 164 and having a flange 166 at one end and a flange 168 at the other end. Additionally, extending angularly outwardly from the long tube portion 164 is a side tube 170 having an outer flange 172. As shown in FIG. 8, a small diameter rod 173 is positioned within the side tube 170, extends diametrically across the side tube 170 and is fixed therein and located in a plane generally parallel to a plane normal to the axis of the long tube portion 164.

A strainer member 174 is received in the side tube 170 and includes an elongate strainer plate 176. The elongate plate 176 is rounded at an outer end 178 thereof so as to have a tombstone shape and has a plurality of holes 183 therein much like a piece of Swiss cheese. A reinforcing rib 182 extends outwardly from and is fixed to or integral with the plate 176, as shown, and also to form a divider for the flow of milk from the short tube portion 162 through the strainer plate 176 into the long tube portion 164.

The strainer member 174 further includes a circular end plate 184 from which the strainer plate 176 and rib 182 extend. Also provided is a gasket 186 which is received between the circular end plate 184 and the end flange 172 on the side tube 170. The strainer member 174 is inserted into the short tube 170 with the rib 182 facing upstream of the flow of milk and then a clamp 187 is received about the flange 172 and the peripheral margin of the end plate 184 and tightened, as shown in FIG. 9, to clamp the strainer member 174 within the side tube 170. In this way, any large particles that may be in the milk are caught by the strainer member 174 and trapped within the short tube 170 on either side of the rib 182.

It will be understood that the strainer member 174 is periodically removed from the side tube 170 to remove particles that may have collected therein. Also, it will be understood that the strainer assembly 92 is of simple construction and enables milk or other liquid being collected to be strained in a simple and efficient manner between the air elimimator vessel 42 and the flow meter 94.

Figure 11:
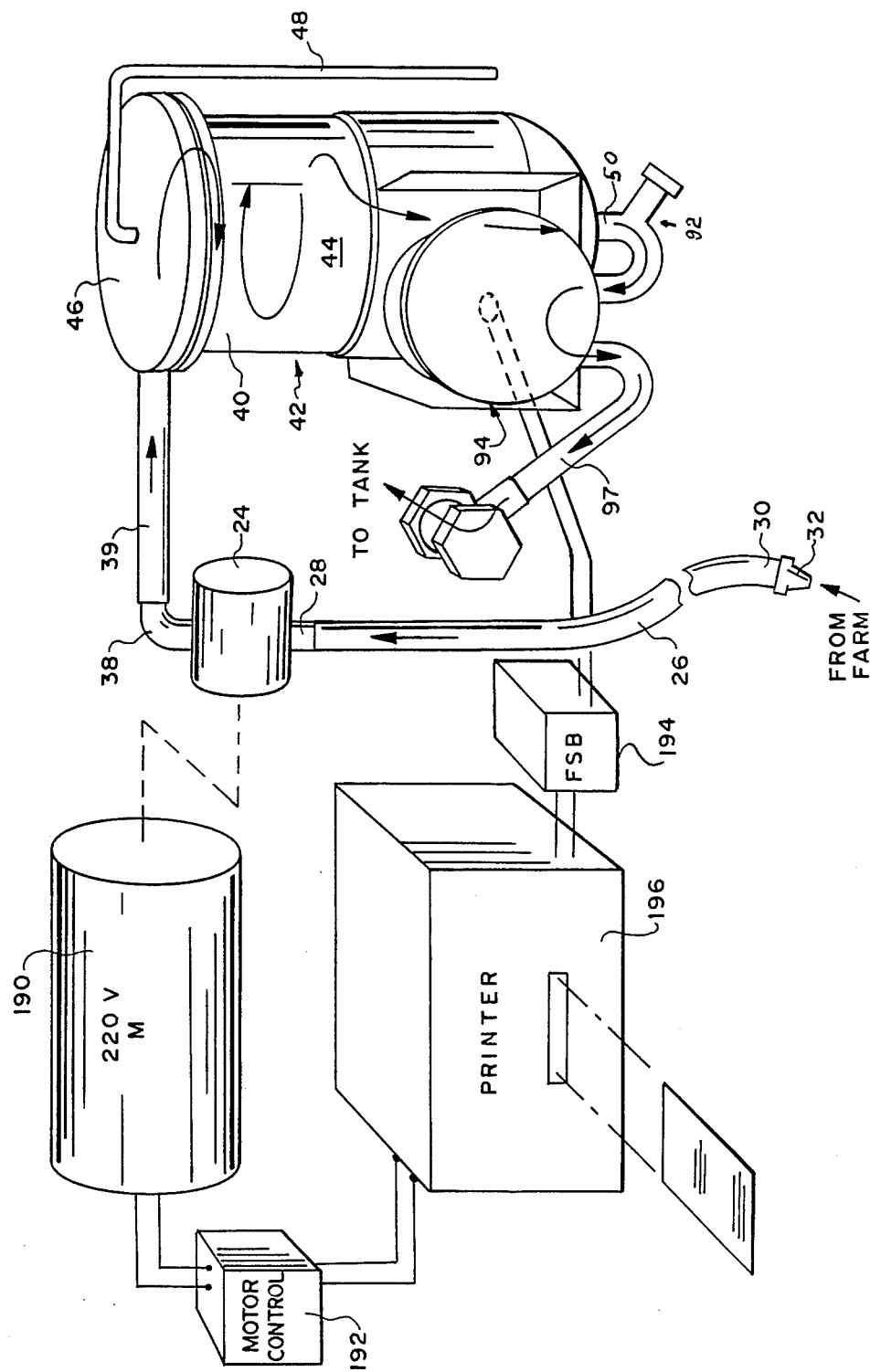
FIG. 11 is a perspective view of the pumping, metering and control system mounted in the compartment shown in FIG. 1.

With reference to FIGS. 1 and 11, in the compartment 16 is located a motor 190 for driving the pump 24. The motor 190 is energized by a control circuit 192 which is coupled to a frequency scaling board 194. The frequency scaling board 194 is also connected to a printer 196 and to the flow meter 94. With this arrangement, the amount of milk pumped and sensed by the flow meter 94 can be calculated by the frequency scaling board 194 which, at the same time controls the operation of the motor 190. When the pumping is finished, the frequency scaling board 194 can tell the printer 196 how much milk has been pumped from the farmer's milk bulk cooler into the tank truck/trailer so that a printed receipt can be supplied to the farmer.

As shown in FIG. 11, the milk comes in through the inlet hose 26 through the pump 24, the hose 39 to the air eliminator vessel 42 where air is eliminated through the vent tube 48 from the cylindrical body 44. Then the pumped milk flows through the strainer assembly 92, the flow meter 94 and the hose 97 into the tank.

From the foregoing description, it will be apparrent that the metering assembly for a tank truck/trailer of the present invention has a number of advantages some of which have been described above and others of which are inherent in the invention. Also, modifications can be made to the metering assembly of the present invention without departing from the teachings of the invention. Accordingly, the scope of the invention is only to be limited as necessitated by the accompanying claims.

I claim:

1. According to the present invention there is provided a metering assembly for a tank truck/trailer comprising: an air eliminator vessel; means for mounting the air eliminator vessel in a compartment of the tank truck/trailer; a pump mounted in the compartment; a fluid connection between the pump and the air eliminator vessel; a hose connected to the pump and adapted to be inserted in an outside receptacle containing liquid to be pumped into or out of the tank truck/trailer; a flow meter fluidly coupled to the air eliminator vessel; an outlet from the flow meter coupled to the tank of the tank truck/trailer; and means for straining liquid pumped from or to the receptacle prior to the delivery of the liquid into or from the tank of the tank truck/trailer, said means for straining liquid including a strainer assembly coupled between the outlet of said air eliminator vessel and the inlet to said flow meter, the strainer assembly comprising a tubular elbow having a short tube portion and long tube portion, a side tube extending laterally outwardly from said long tube portion adjacent the corner connection with said short tube portion, and a strainer member in the form of an elongate strainer plate received in said side tube and positioned to block the flow of any large particles flowing through said tubular elbow, said strainer plate having a rib which extends outwardly from and longitudinally along one side of said strainer plate.

2. The metering assembly of claim 1 wherein said elongate strainer plate has a rounded end so as to have the shape of a tombstone and has openings therethrough.

3. The metering assembly of claim 1 wherein said strainer member includes a circular end plate from which said elongate plate extends.

4. The metering assembly of claim 3 including a guide rod fixed within and across said side tube, said strainer plate being received on one side of said guide rod so as to be located across said long tube portion to fully intersect the flow of liquid flowing through the strainer assembly.

5. The metering assembly of claim 3 wherein said strainer assembly further includes a flange at the outer end of said side tube and a clamp which is received over said flange and said circular end plate for clamping the circular end plate to the end flange.

6. A metering assembly for a tank truck/trailer comprising: an air eliminator vessel comprising a hollow body; means for mounting said air eliminator vessel in a compartment of the tank truck/trailer including first and second legs fixed to and depending from the hollow body and a U-shaped bracket mounted on a wall of the compartment and an L-in-cross-section bracket mounted to the body and having an outer depending flange which is received within the U space of the U-shaped bracket; a pump mounted in the compartment; a fluid connection between the pump and the air eliminator vessel; a hose connected to the pump and adapted to be inserted in an outside receptacle containing liquid to be pumped into or out of the tank truck/trailer; a flow meter fluidly coupled to the air eliminator vessel; an outlet from said flow meter coupled to the tank of the tank truck/trailer; and means for straining liquid pumped from or to the receptacle prior to the delivery of the liquid into or from the tank of the tank truck/trailer.

7. The metering assembly of claim 6 wherein said mounting means include foot members mounted on the bottom wall of the compartment and each of said legs has a lower end received on and clamped to one of said foot members.

8. The metering assembly of claim 6 further including: measuring curcuit means comprising a frequency scaling board coupled to said flow meter; a printer coupled to said frequency scaling board for printing out the amount of liquid received in the tank from an outside bulk cooler; a motor control circuit coupled to said frequency scaling board; and, a motor mechanically coupled to said pump for driving same and electrically coupled to said motor control circuit.

9. A metering assembly for a tank truck/trailer comprising: an air eliminator vessel; means for mounting the air eliminator vessel in a compartment of the tank truck/trailer; a pump mounted in the compartment: a fluid connection between the pump and the air eliminator vessel; a hose connected to the pump and adapted to be inserted in an outside receptacle containing liquid to be pumped into or out of the tank truck/trailer; a flow meter fluidly coupled to the air eliminator vessel; mounting means for mounting said flow meter to said air eliminator vessel including a metal reinforcing band around and fixed to said vessel, and a bracket including a vertical portion fixed to said metal reinforcing band and extending downwardly to a horizontal portion and an incline vertical portion which extends upwardly on the other side of said horizontal portion and is fixed to said metal reinforcing band, said flow meter being supported on said horizontal portion of said bracket; an outlet from said flow meter coupled to the tank of the tank truck/trailer; and means for straining liquid pumped from or to the receptacle prior to the delivery of the liquid into or out of the tank of the tank truck/trailer.

* * * * *